US012579862B2

(12) United States Patent
Higgins et al.

(10) Patent No.: US 12,579,862 B2
(45) Date of Patent: Mar. 17, 2026

(54) JACKPOT AND WIN CELEBRATION IN A VIRTUAL REALITY AND AUGMENTED REALITY ENVIRONMENT

(71) Applicant: IGT, Las Vegas, NV (US)

(72) Inventors: Kevin Higgins, Reno, NV (US);
Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 465 days.

(21) Appl. No.: 18/079,990

(22) Filed: Dec. 13, 2022

(65) Prior Publication Data

US 2024/0194021 A1      Jun. 13, 2024

(51) Int. Cl.
| | |
|---|---|
| *G07F 17/32* | (2006.01) |
| *G06T 13/40* | (2011.01) |
| *G06T 19/00* | (2011.01) |

(52) U.S. Cl.
CPC ............ *G07F 17/323* (2013.01); *G06T 13/40* (2013.01); *G06T 19/006* (2013.01); *G07F 17/3211* (2013.01); *G07F 17/3258* (2013.01)

(58) Field of Classification Search
CPC ............... G07F 17/323; G07F 17/3211; G07F 17/3258; G06T 13/40; G06T 19/006; A63F 2300/8082; G06F 3/011
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 2012/0015735 A1* | 1/2012 | Abouchar | G07F 17/3237 |
| | | | 463/42 |
| 2013/0184064 A1* | 7/2013 | Manning | G07F 17/32 |
| | | | 463/32 |
| 2018/0350144 A1* | 12/2018 | Rathod | G06Q 20/3224 |
| 2021/0366174 A1* | 11/2021 | Reilly | H04N 23/90 |
| 2024/0203058 A1* | 6/2024 | Purcell | G06F 16/41 |

* cited by examiner

*Primary Examiner* — Werner G Garner
(74) *Attorney, Agent, or Firm* — Sheridan Ross P.C.

(57) ABSTRACT

Embodiments of the present disclosure are directed to increasing involvement of and interaction between participants in a virtual reality or augmented reality environment. According to one embodiment, a win event can be detected within an electronic game being played within a virtual casino. In response to detecting the win event, an indication of the detected win event can be provided to a user other than the player of the game. Providing the indication of the detected win event can comprise modifying the provided representation of the virtual casino, changing the avatar for the player of the electronic game in the virtual casino, etc. An indication of a reaction to win event by the user can be received and a representation of the reaction can be provided to the player.

15 Claims, 9 Drawing Sheets

605

Provide virtual casino

610

Execute electronic game in virtual casino

615

Detect a win event in the electronic game

620

Select user device(s) to notify

625

Provide indication of win event to selected user device(s)

630

Receive indication of reaction to win event

635

Provide indication of reaction to user device of player

705

Receive message
indicating
occurrence of a
win event

710

Notify user?

N

Y

715

Generate
indication of win
event

720

Provide indication
of win event to
user's device

725

Receive indication
of reaction

730

Matches
prompt?

N

Y

735

Update user's
record(s)

JACKPOT AND WIN CELEBRATION IN A VIRTUAL REALITY AND AUGMENTED REALITY ENVIRONMENT

BACKGROUND

The present disclosure is generally directed to enhancing a gaming experience in virtual reality and augmented reality environments and, in particular, toward increasing involvement of and interaction between participants in a virtual reality or augmented reality environment.

In a traditional casino environment, when users win large jackpots, e.g., progressive wins of various types, top awards on an Electronic Gaming Machine (EGM) paytables, etc., the large win is typically accompanied by various mechanisms that trigger everyone at the casino to look and notice the large win, which results in some users cheering on the win, or feeling like they could get lucky themselves. In various online gambling environments, that feeling of excitement when you are near somebody who wins a jackpot, is very much missing today. While some online platforms have implemented various features like message notifications when jackpots occur, or update key areas of the homepage to notify users of recent wins, the experience is still fundamentally different.

BRIEF SUMMARY

Embodiments of the present disclosure are directed to increasing involvement of and interaction between participants in a virtual reality or augmented reality environment. According to one embodiment, a method for operating a virtual casino can comprise providing, to a plurality of user devices, a representation of the virtual casino. A user of each of the plurality of user devices can be represented in the virtual casino by an avatar. An electronic game can be executed within the virtual casino and a representation of the electronic game can be provided to a first user device of the plurality of user devices during execution of the electronic game. The first user device can be associated with a player of the electronic game.

A win event can be detected within the electronic game during execution of the electronic game. In response to detecting the win event, an indication of the detected win event can be provided to a second user device of the plurality of user devices. The second user device can be associated with a user other than the player of the electronic game. The second user device can be selected from the plurality of user devices based on a location of the avatar representing the user other than the player of the game within the virtual casino, a predefined constraint related to providing the indication of the detected win event, a status of the user other than the player of the electronic game within the virtual casino, a predefined parameter of a user profile for the user other than the player of the electronic game, and/or other considerations. Providing the indication of the detected win event can comprise modifying the provided representation of the virtual casino, changing the avatar for the player of the electronic game in the virtual casino, etc.

An indication of a reaction to win event by the user other than the player of the electronic game can be received from the second user device. In some cases, an indication of an incentive for the user other than the player of the electronic game to react to the win event can be provided to the second user device. A representation of the reaction to the win event by the user other than the player of the electronic game can be provided to the first user device.

According to another embodiment, a system can comprise a communications network, an Augmented Reality (AR) device communicatively coupled with the communications network, and an AR server communicatively coupled with the communications network. The AR server can comprise a processor and a memory coupled with and readable by the processor. The memory can store therein a set of instructions which, when executed by the processor, causes the processor to receive, from a gaming system, an electronic message indicating occurrence of a win event in an electronic game being executed by the gaming system. A determination can be made as to whether to notify a user of the AR device of the occurrence of the win event. The user of the AR device can be other than a player of the electronic game. For example, determining whether to notify the user of the AR device of the occurrence of the win event can be based on a physical location of the user of the AR device within a physical gaming venue in which the gaming system is located.

In response to determining to provide the indication of the win event to the user of the AR device, an indication of the win event can be generated and provided to the AR device via the communications network. The indication of the win event can comprise, for example, a prompt to react to the win event. In some cases, the prompt to react to the win event can comprise a prompt to physically react to the win event. In such cases, the instructions can further cause the processor to receive, from the AR device, via the communications network, an indication of an action performed by the user of the AR device and determine, based on the received indication of the action performed by the user of the AR device, whether the action performed by the user of the AR device matches an action indicated by the prompt to react to the win event. In response to determining the action performed by the user of the AR device matches the action indicated by the prompt to react to the win event, the instructions can further cause the processor to update an electronic record associated with the user of the AR device to indicate an award to the user of the AR device.

According to yet another embodiment, a system can comprise a communications network, a physical gaming system communicatively coupled with the communications network and executing an electronic game, a user device communicatively coupled with the communications system, and a Virtual Reality (VR) system communicatively coupled with the communications network. The VR system can comprise a processor and a memory coupled with and readable by the processor. The memory can store therein a set of instructions which, when executed by the processor, causes the processor to provide, to the user device, via the communications network, a representation of a virtual casino. The virtual casino can comprise a VR representation of the physical gaming system. The instructions stored in the memory of the VR system can further cause the processor of the VR system to receive, from the physical gaming system, via the communications network, an indication of a win event occurring within the electronic game during execution of the electronic game by the physical gaming system and in response to the indication of the win event, provide, to the user device, through the communications network, an indication of the detected win event on the VR representation of the physical gaming system in the virtual casino.

The system can further comprise an Augmented Reality (AR) system. The AR system can comprise a processor and a memory coupled with and readable by the processor. The memory of the AR system can store therein a set of instructions which, when executed by the processor of the AR system, causes the processor of the AR system to receive, from the physical gaming system, via the communications network, an electronic indication of the win event, determine whether to notify a user of an AR device of the occurrence of the win event, wherein the user of the AR device is not a player of the electronic game, and in response to determining to provide the indication of the win event to the user of the AR device, generate an indication of the win event and provide the generated indication of the win event to the AR device via the communications network.

The instructions executed by the processor of the VR system can further cause the processor of the VR system to execute a virtual electronic game in the virtual casino, the virtual electronic game corresponding to the physical gaming system, detect a win event within the virtual electronic game during execution of the virtual electronic game, and in response to detecting the win event, provide, to the AR system, via the communications network, an indication of the detected win event in the virtual electronic game.

The instructions executed by the processor of the AR system further cause the processor of the AR system to receive, from the VR system, via the communications network, the indication of the detected win event in the virtual electronic game and determine whether to provide the user of the AR device a notification of the win event in the virtual electronic game. The instructions executed by the processor of the AR system can further cause the processor of the AR system to, in response to determining to provide the user of the AR device notification of the win event in the virtual electronic game, generate an indication of the win event and provide the generated indication of the win event to the AR device via the communications network.

Additional features and advantages are described herein and will be apparent from the following Description and the figures.

DETAILED DESCRIPTION

Embodiments of the present disclosure are directed to increasing involvement of and interaction between participants in a Virtual Reality (VR) or Augmented Reality (AR) environment such as a virtual and/or real-life casino or other gaming venue. When jackpots occur on the casino floor in real life, players in the vicinity become aware of the jackpot hit due to the sound, screams, yells, cheering or other celebratory aspects that humans or the game create when a player wins a jackpot. This gives nearby users an opportunity to participate in the celebration, perhaps by cheering or watching the event themselves. This also may increase the overall wagering on the floor, as users with adjacent avatars may feel like the area is lucky, or they may just have a general desire to be the person winning a jackpot after they saw somebody else win one. Embodiments described herein are directed to creating similar involvement and interaction in a virtual casino or gaming environment as well as in augmented reality within a real-life casino.

Figure 1:
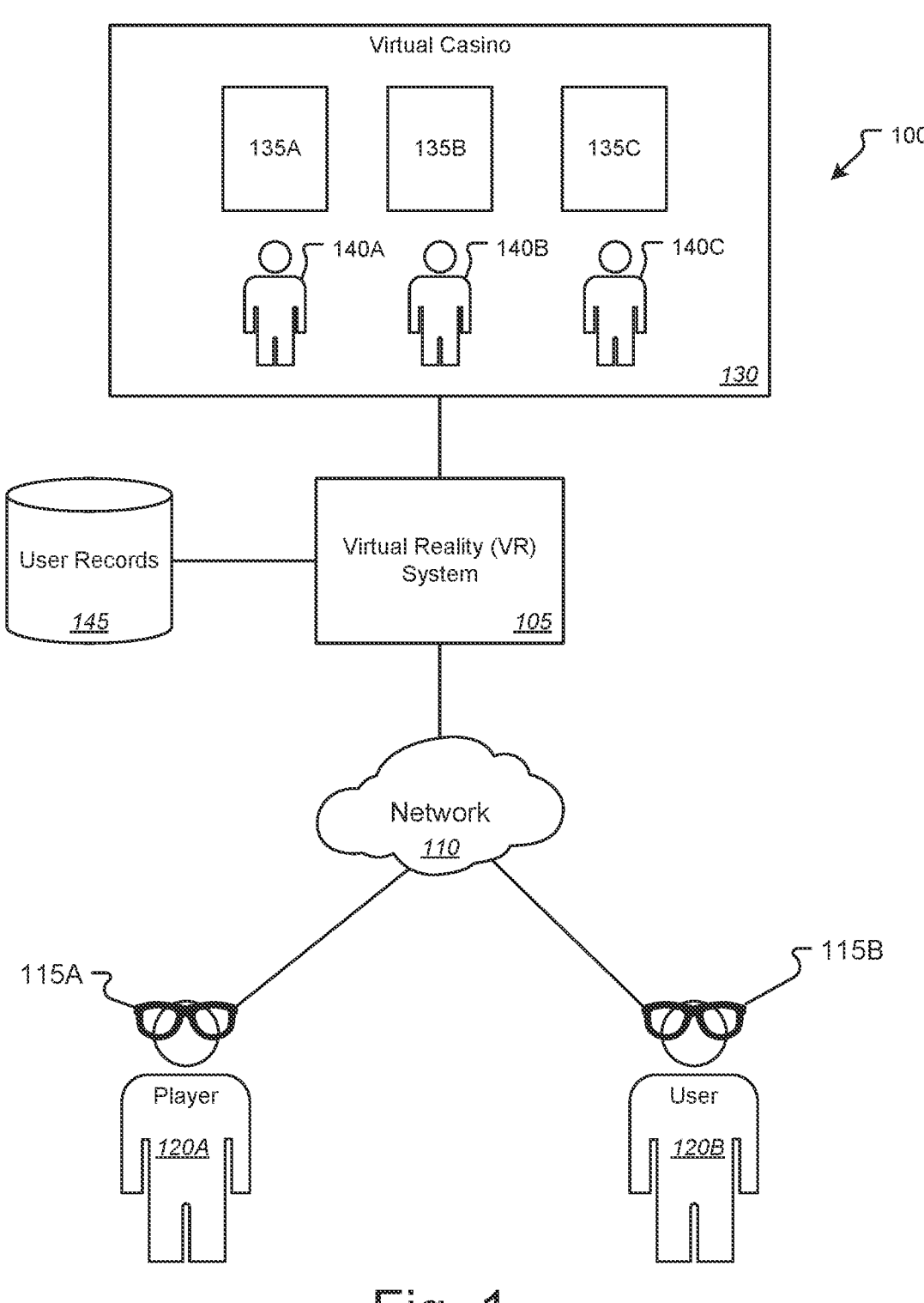
FIG. 1 is a block diagram illustrating elements of an exemplary environment for implementing a virtual casino according to one embodiment of the present disclosure.

FIG. 1 is a block diagram illustrating elements of an exemplary environment for implementing a virtual casino according to one embodiment of the present disclosure. As illustrated in this example, the environment 100 can include a VR system 105 communicatively coupled with a communications network 110. The communications network 110 can comprise any one or more wired and/or wireless local area and/or wide area networks as known in the art. Also coupled with the communications network 110 can be any number of VR user devices 115A 115B such a hearable headset, glasses, etc. as known in the art.

Through the VR devices 115A and 115B, the VR system 105 can provide to users 120A and 120B a representation of a virtual casino 130. The virtual casino can comprise one or more virtual Electronic Gaming Machines (EGMs) or other virtual gaming systems 135A-135C and each user can be represented by an avatar 140A and 140B. Through the VR devices 115A and 115B, the VR system 105 can allow the users 120A and 120B to move their avatars 140A and 140B around the virtual casino, interact with the virtual gaming systems 135A-135C, interact with each other, etc. For example, a user 120A can manipulate his avatar 140A to interact with a virtual gaming system 135A to play an electronic game such as slots, video poker, a table game, or any other casino game.

In the virtual casino 130, this user 120A or player may win a jackpot or a similar win event may occur when he is playing the electronic game. The VR system 105 may then make the typical sights and sounds of a jackpot in the virtual casino 130. According to one embodiment, these sights and sounds may be provided to the player 120A as well as other users 120B through the VR user devices 115A and 115B. For example, these indications may be provided to a user who's avatars 140B are located in the virtual casino 130 adjacent to the virtual gaming system 135A where the win event occurred. For example, if a win event occurs, and the winning virtual gaming system 135A plays celebratory music, rings a virtual bell, etc., a user 120B who's avatar 140B is within 50 feet (in virtual space) may also hear or see various aspects of the win event through his VR user device 115B. Aspects of the win event can include a celebration, e.g., fist pumping, jumping, dancing, shouting, singing, etc., by the avatar of the wining user. This can be presented to other users and/or to the wining user, e.g., by panning outside of the user's "body" to see his or her own avatar.

Some aspects of the experience may be adjusted based upon distance. For example, users who's avatars are immediately adjacent to the winning virtual gaming system 135A may experience the full sound of the celebration triggered by the winning virtual gaming system 135A, whereas users who's avatars are further away may experience an adjusted experience based upon their distance from the winning virtual gaming system 135A, e.g., lower sound level, etc.

According to one embodiment, users 115A and 115B may not be able to talk to each other over audio (perhaps only via chat), but when a win event occurs, the winning player 115A, and perhaps even users with adjacent avatars, may be able to momentarily speak into a microphone and have their audio shared with the other users. The VR system 105 may mix the audio of the reactions of users with adjacent avatars and send them to other users with adjacent avatars, with perhaps volume adjusted based upon user's avatar's distance from the winning virtual gaming system 135A, or distance from the avatar of the user who recorded an audio reaction. In another embodiment, the view of the virtual casino 130 presented to a user 115B who's avatar 140B is in the vicinity of a virtual gaming system 135A in which a win event occurred may include a display of one or more possible canned, or pre-recorded reactions that the user 115B can trigger in order to participate in the celebration. For example, the user's 120B VR user device 115B can display something describing to the user 120B that a nearby win event occurred, and then give that user 120B the option to trigger his avatar 140B to say, "great win", or "good job", or yell "yahoo!", etc.

Physical reactions of avatars 140A and 140B may also be possible by the winning player and users aware of the win event. For example, the avatar 140A for the winning player 120A or another nearby avatar 140B could stand up, raise their hands in the air, clap, etc. These reactions may be triggered via selection on the user's VR user device 115A or 115B or may be triggered based upon detection of the user's real-life physical actions detected by their VR user device 115A or 115B. According to yet another embodiment, can be determined and presented by the VR system 105 regardless of and/or without need for input by any of the users.

In another embodiment, users with avatars adjacent to the winning player's avatar may have their view of the virtual casino 130 forced to pan over and look at the winning virtual gaming system 135A. For example, a user 120B with an adjacent avatar 140B may see an overlay which says, "Jackpot Hit by Lucky Player!" and then his view of the virtual casino 130 scans away from where he is currently looking to look at the winning virtual gaming system 135A for a short period of time, e.g., 30 s, etc. The duration of the panning may be controlled by the VR system 105 based on the amount or type of win. For example, a larger win may make more users look at the winner or make them look for a longer time compared to a small win. The VR system 105 can have a threshold for triggering the panning, such as wins over $50 cause users to "pan" and look at the winner. In one embodiment, the VR system 105 can take into account player loyalty account status maintained in a set of user records 145 when deciding when and how to pan. For example, users might pan to look at a gold club member but not pan to look at a user without a player account or lower player account status. The duration of the pan, etc. could be configured by status. In another embodiment the VR system 105 can take into account previous player activity and/or floor activity to determine the parameters of the panning. For example, if the floor is busy the panning could be quicker than during a time where the floor is not busy. The panning could skip when a second user hits a large win right after another one as to not annoy users with continual panning. The VR system 105 could pan the view for certain types of wins such as bonus wins or game/system events. For example, a system event could be a floor wide lucky coin win.

In another embodiment, the user's view may not change their gaze or direction but instead overlay on the view of the virtual casino 130 a current view of the winning player's avatar 140A at the winning virtual gaming system 135A. In another embodiment, a user's 120B view may present a replay, overlaid on the view of the virtual casino 130, of the win event. In another embodiment, a user 120B may simply receive a notification that a nearby win event occurred, and then be asked if he wants to view the win event or participate in the celebration. In such an embodiment, player engagement in the win event may be optional and not forced or required.

In another embodiment, other users 120B can congratulate the winning player 120A in various ways. In the simplest embodiment, upon display on a user's VR user device 115B that an adjacent player won, the user's 120B VR user device 115B may then give the option to give the win event a thumbs up, or a clap, or a cheer, etc. In another embodiment, monetary means of congratulations may be possible. For example, users 120B with adjacent avatars 140B may be given the option to send the player 120A a tip of a selectable or pre-configured or pre-determined amount, e.g., send the winning player $5 as congratulations.

In other embodiments, the VR system 105 can attempt to coordinate user reactions across the virtual casino 130. For example, an overlay on the view of the virtual casino 130 may ask the user to "be loud", or "clap", or "cheer" immediately after the win event of a winning player.

In a physical casino, users typically only become aware of win events that occur physically nearby. In a virtual casino 130, while such a similar restriction could exist to more closely model the physical world as described above, those physical restrictions could also be removed. For example, no adjacency constraint may exist in the virtual casino 130 for win event celebrations. In other words, all users in the virtual casino 130 can become aware of win events and corresponding celebrations. Other embodiments are also possible, where a percentage of the virtual casino 130 floor, e.g., 50%, could be made aware of the win event. Other more sophisticated algorithms are also possible to determine or select the users who are made aware of win events that occur on the virtual casino 130 floor. In one embodiment, the VR system 105 can target a certain number or rate of win events seen by a user while in the virtual casino 130, e.g., at least 1 per hour or at least 1 per hour and at most 1 per 15 minutes, etc. The VR system 105 can then find users that match those constraints and then notify those selected users via one of the previously mentioned methods that a win event has occurred in the virtual casino 130.

Allowing users to learn about win events that are not occurring nearby to them may seem odd, or un-natural in a VR environment. In certain embodiments, in order to make win events in the virtual casino 130 seem more natural that do not occur nearby, the VR system 105 may alter the virtual casino 130 as seen by the targeted user 120B to super-impose the win event onto a virtual gaming system 135A nearby the targeted user's 120B avatar 140B. For example, a win event hit may occur on a virtual EGM on the other side of the Virtual casino 130, and a user who's avatar is on the completely opposite side of the virtual casino 130 may see a virtual EGM at the end of the current bank hit a win event instead. When this occurs, the behavior of the player's avatar at the winning virtual EGM at the end of the bank may match or mimic the behavior of the virtual player who actually hit the win event. For example, the avatar of the virtual player sitting in front of the virtual EGM upon which the win event hit was super-imposed may jump up in the air, clap, cheer, etc. In another embodiment, prior to, or concurrent with the win event being super-imposed on the adjacent virtual EGM, the avatar of the player at that virtual EGM may switch to represent the player avatar at the actual virtual EGM where the win event occurred.

In some embodiments, the VR system 105 can take into account player account status, previous activity or game event type (bonus win, free spin, etc.), game type, and other information stored in the user records 145 when determining how and when to show nearby events for a targeted user. In some embodiments, the user records 145 can store configuration parameters used to determine settings for the VR celebrations or panning effects described above. For example, a gold player might request to not have others pan to look at her or not have her device pan to see other users. In another embodiment the VR system 105 can determine from settings in the user records that the user likes a certain game type, such as poker, and therefore can pan or celebrates poker wins instead of other types of wins, e.g., slots, table games, sports, etc. In one embodiment the VR system can determine from the user records 145 how the player wagers on sports and adjust the celebrations to match their interests. For example, if a user wagers on the Cowboys the VR system can pan this and other users who also wagered on the Cowboys game when somebody wins an in-game sports wager in a Cowboys game.

The celebration graphics and sounds might vary by game type, e.g., poker, slot, progressive, sports wagering, keno, etc. or by game parameters, e.g., denomination, wager amount, game theme, etc. The celebration can vary by win amount, odds of hitting the award of pay category, e.g., 3 cherry win vs 4 cherry win. Within a specific game type, some components of the celebration may be tied to the win. For example, if a player makes an in-game wager that the Dallas Cowboys will make a 50 yard or greater run in the first half, and they win, then their celebration could include aspects of the wager. In one example, celebrations displayed on any signage could be tied to the team colors, the player who made the run, etc. In another example, the winning player's avatar could change aspects of the avatar's skin(s) to match the winning team, e.g., it could wear a Cowboy's jersey, etc. In another example, the winning player's avatar could perform an action in the Virtual casino that is similar to the winning play of the game, such as running across the casino floor with a virtual football.

In some embodiments, more than one player may win, and therefore the panning action can pan across more than one player. For example, more than one player may win a jackpot. In another example, certain win events offer consolation or celebration prizes. In one embodiment, the panning of the camera to celebrate the various win events hit could reserve equal time for all winners. In another embodiment, the panning of the camera or gaze could be weighted based upon the jackpot amount or amount won across the set of users.

In other embodiments, the virtual casino 130 may foster an ecosystem of fun and collaboration amongst users when a win event occurs. This can be achieved by providing various forms of incentive to users who participate in a win event celebration. In one embodiment, the first users, e.g., the first ten, to give the winning player a high five in the virtual casino 130 could get an award, e.g., $10 of free play, 500 extra points, a point multiplier, tier credits, a form of flare such as avatar upgrades, status, etc., a free ticket or tickets into a drawing, or other incentive. Those eligible to participate can also be limited. In one embodiment, anybody in the virtual casino 130 can participate in the celebration and be eligible to win the celebratory prize(s). In another embodiment, only those users who are currently engaged with a virtual gaming system, or have wagered a certain amount within some time period, etc., can earn prizes or even participate. For example, only users who have wagered at least a predefined amount over a predefined period of time, e.g., $10 in the past 30 minutes, can be eligible to give the winner a high-five and can be eligible to win a participation prize.

In a physical casino, many players who win are naturally concerned about other users learning about how much they have won. Numerous players have been physically harmed in robberies or robbery attempts after they have left the casino after winning large amounts. This almost creates a dis-incentive for users to celebrate win events. In a VR environment, users will naturally feel much safer and will be much more willing to participate in a win event celebration. In fact, artifacts or evidence that the player won may be long lasting. When a player wins in a virtual casino 130, the win event celebration may be much more elaborate than what occurs in the physical world. For example, the player may be instantly known to other users in the virtual casino 130, such as by other users actually watching the win event hit, or a win event hit replay, or by watching or participating in the win event celebration. Users who win can then be associated with or awarded items that can follow their avatar throughout the virtual casino 130 or even a broader virtual world. For example, a player who won may walk around the casino with a win amount over the head of their avatar for a period of time.

In another embodiment, winners could be awarded special winner items for their avatar to wear, or different or unique physical characteristics of their avatar. For example, avatar height may indicate win events won by the player recently, e.g., over the past week, where a really tall avatar may be a large winner. In another embodiment, a winners avatar may float above the VR ground, while other non-winners may have to walk with their avatar's feet touching the ground when moving about the virtual casino 130. In another embodiment, a recent winner, e.g., in the past 2 hours, may have a dedicated butler avatar follow them around the casino. In another embodiment, a winner may have a staff member avatar which lays down a red carpet in front of the winner's avatar as they walk throughout the virtual casino 130. In another embodiment, a winner may have coin shower sounds, or winning payline hit sounds follow them when they walk throughout the casino.

The ability to adjust the avatar could be linked to player account status or to player history, e.g., users who have wagered more than $500 in the past 24 hours. It could also be tied to triggering or winning a particular game or system event.

The avatar enhancements could be based on the game type, e.g., poker, slots, sports, etc., or game configuration/ parameters, e.g., denomination, wager, etc. For example, a player hitting a royal flush at a $1 denomination might have a suit that looks like a King (royal theme) while a player winning a sports wager on a Cowboys game might have a Cowboys theme football helmet or jersey.

Figure 2:
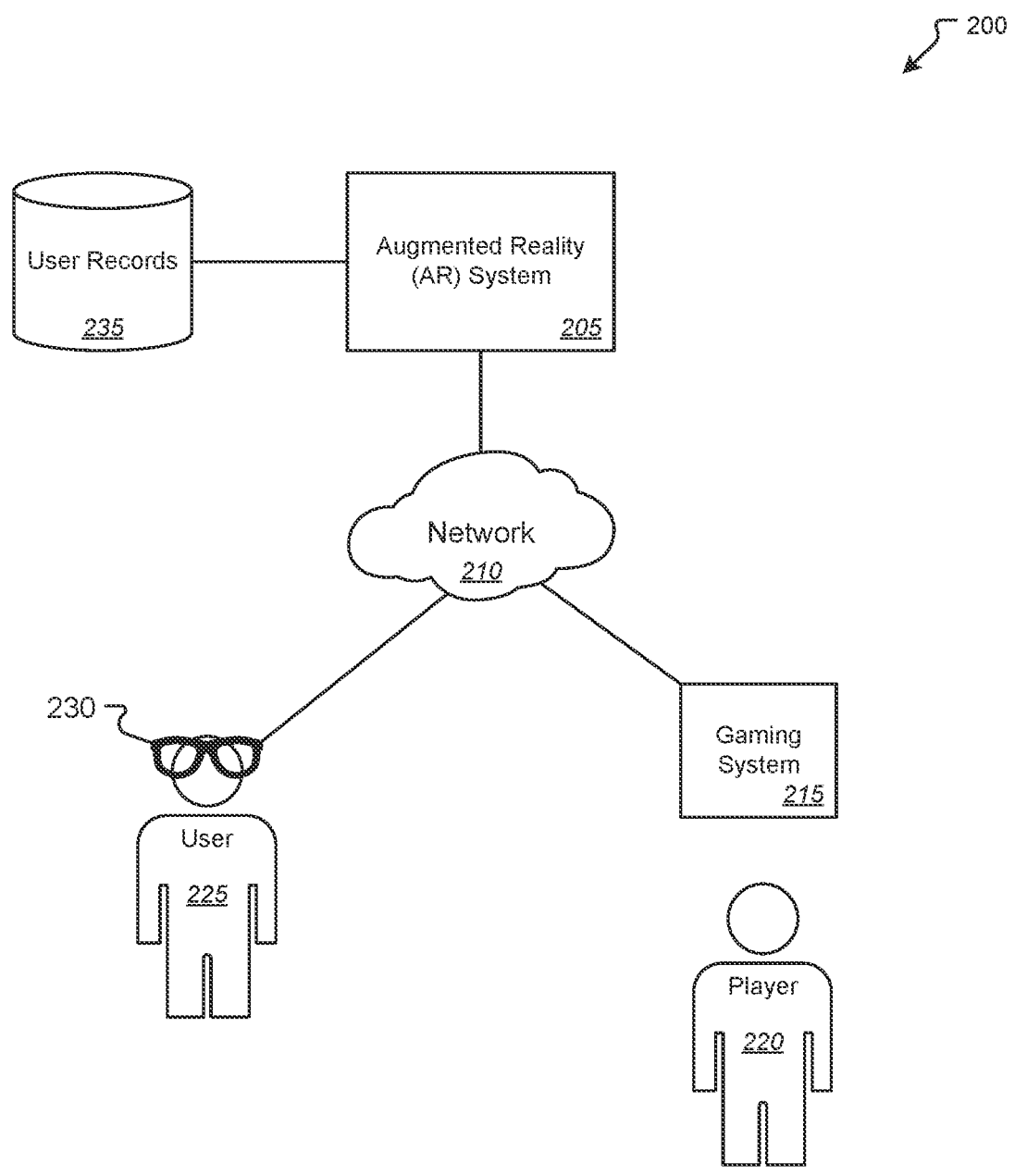
FIG. 2 is a block diagram illustrating elements of an exemplary environment for providing augmented reality enhancements according to one embodiment of the present disclosure.

FIG. 2 is a block diagram illustrating elements of an exemplary environment for providing augmented reality enhancements according to one embodiment of the present disclosure. As illustrated here, the environment 200 can comprise an AR system 205 communicatively coupled with a communications network 210. The communications network 210 can comprise any one or more wired and/or wireless local area and/or wide area networks as known in the art. One or more physical gaming systems 215 can also be communicatively coupled with the communications network 210. The gaming system can comprise, for example, an EGM, an electronic table game, a kiosk, etc. installed in a casino or other gaming venue. Through the gaming system 215 a player 220 can play any of a number of commonly known casino games.

Also coupled with the communications network 210 can be any number of AR user devices 230 such a hearable headset, glasses, etc. as known in the art. Generally speaking, the AR system 205 can provide various visual and audio enhancements to a user 225 wearing the AR user device 230. In some embodiment, users may leverage AR user devices 230 in order to play AR-enabled aspects of one or more EGMs, one or more table games, etc. Within a physical casino environment, the AR system 205 can communicate with a user's 225 AR user device 230 in order to notify them of win events across the casino floor, including those that are outside of the range in which users would traditionally be able to become aware of win events on the casino floor. That is, the AR system 205 can receive an indication of a win event on a physical gaming system 215 and, through the user's 225 AR user device 230, notify the user of a win by the player 220. These notifications can be provided to the user 225 in a manner similar to those described above in the virtual casino 130, e.g., based on proximity, a user history or parameters stored in user records 235, etc., but adapted to the AR user device 230.

In one embodiment, an AR-enabled user 225 could become aware of win event across the casino floor. In another embodiment, when a user 225 of an AR user device 230 becomes aware of win event across the casino floor, the user 225 can choose to participate in the celebration, such as by congratulating the winning player 220 and triggering other celebratory behavior that the winning player 220 may become aware of through use of an AR user device (not shown here) themselves. In another embodiment, a user 225 who is wearing an AR user device 230 could be encouraged by the AR system 205 to perform physical actions to participate in the win event celebration process. For example, users could be encouraged to physically cheer for the winning player 220, clap, get up and high-five the winning player 220, etc. If the user 225 performs the requested action in the physical world, the AR system 205 can confirm that the player performed the celebratory behavior and award or coordinate the awarding of a celebration award to the user 225, such as promo credits, points, a point multiplier, tier credits, comps, etc.

Figure 3:
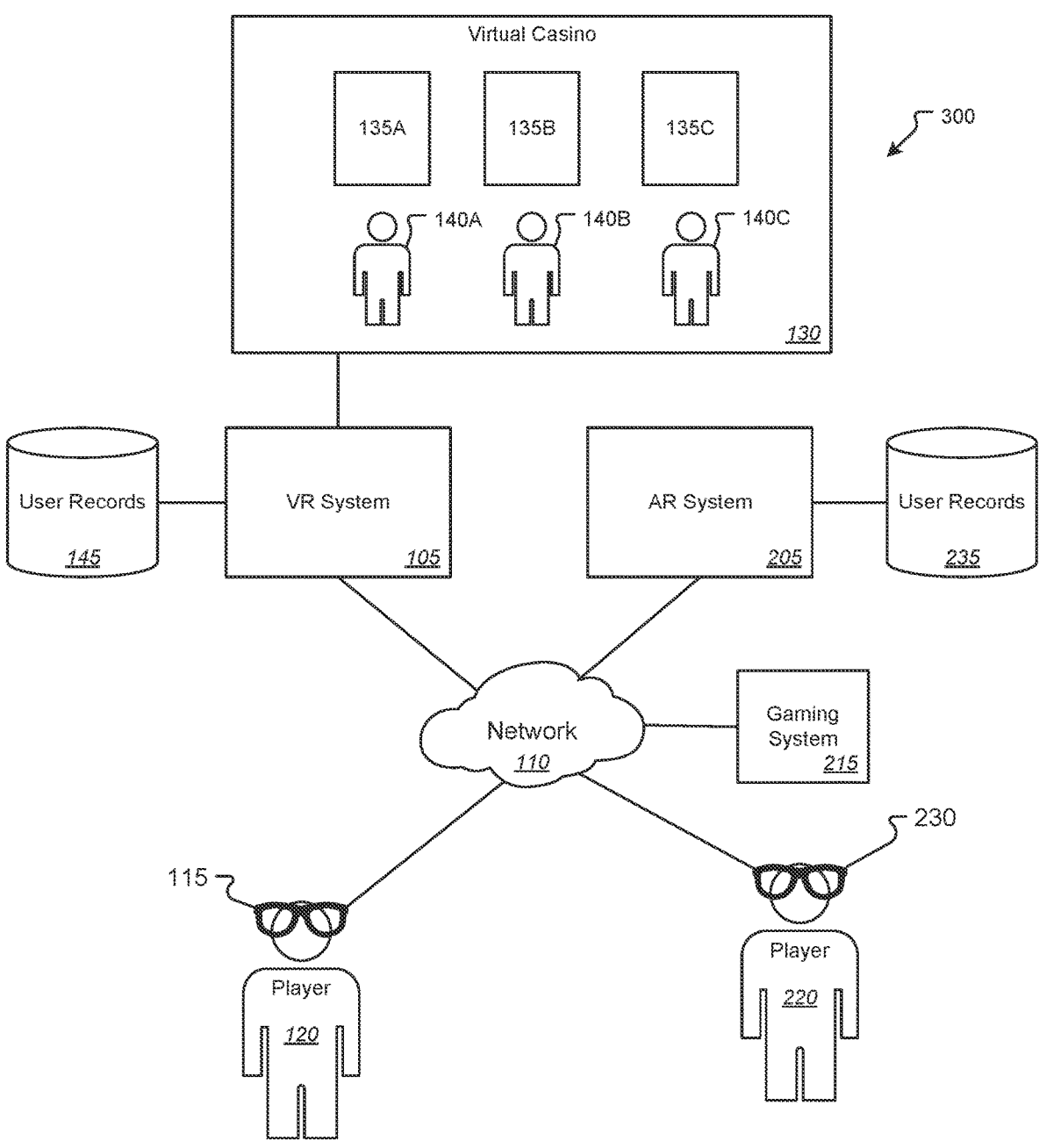
FIG. 3 is a block diagram illustrating elements of an exemplary environment for providing a mixed presentation of real life, virtual reality, and augmented reality according to one embodiment of the present disclosure.

FIG. 3 is a block diagram illustrating elements of an exemplary environment for providing a mixed presentation of real life, virtual reality, and augmented reality according to one embodiment of the present disclosure. In this example, the environment 300 includes the elements of both the virtual reality implementation described above with reference to FIG. 1 and the augmented reality implementation described above with reference to FIG. 2. All of these elements can operate in the same manner as described above. Additionally, the VR system 105 and the AR system 205 can operate to merge the virtual casino 130 with a real-life casino.

More specifically, the virtual casino 130 world can be mapped to or modeled after a physical casino, e.g., a physical gaming system 215 can be represented in the virtual casino 130 by a virtual gaming system 135C at a location representing the physical location of the physical gaming system 215 in the physical casino. This lets users in the virtual casino 130 continue to experience the physical casino while online. It is possible that large wins or win events in the virtual casino 130 can be translated into the physical world, resulting in win event celebrations in one or more corresponding physical casinos. Similarly, wins in the physical casino may be represented on a virtual gaming system 135C in the virtual casino 130, resulting in virtual celebrations.

In one embodiment, a player 120 playing in the virtual casino 130 may actually occupy a physical gaming system (not shown here), or seat at a table game, etc., in the physical casino, i.e., by playing the corresponding virtual gaming system 135B in the virtual casino 130. So for example, someone physically walking a bank of physical EGMs in a physical casino can see that they are occupied, at least virtually, but no person is physically seated at those EGMs. Likewise, a player 220 occupying a physical gaming system 215 may also occupy a virtual gaming system 135C in the virtual casino 130. When a win event occurs in the virtual casino 130, the win event can be presented and observed in the corresponding physical casino and vice versa. In one embodiment, a win event or large win in the virtual casino 130 could trigger a celebration in the physical casino that is mapped to various physical elements in that casino. For example, win events or large wins in the virtual casino 130 can trigger celebrations on various signage devices in the physical casino. This could involve animations, play of sound or music, etc. In another embodiment, a win event or large win in the virtual casino 130 could trigger a celebration in the physical casino that is only visible to users with AR user devices 230 or hardware. For example, a player 220 in the physical casino wearing an AR user device 230 might see a signage on the ceiling of the casino animate the final reel stops from the winning player, and then see the winning paylines hit and see additional animations, and hear additional coordinated sound (bell ringing, coin shower sounds, etc.) or music to go along with the win that originally occurred in the virtual casino 130.

The physical casino can also be notified through the VR system 105 and AR system 205 of other actions or activities in the virtual casino 130. In one embodiment, shows or concerts may exist in the virtual casino 130, and users in the physical world could be notified when the VR-based concert starts. In another embodiment, certain gambling events could be VR-only, and users in the physical casino can be notified if the VR-only event is about to begin. For example, a VR-only slot tournament could be about to begin, and users in the physical casino could be notified, e.g., through an AR user device 230, signage, the display of a gaming system 215, etc. Some events could be hybrid VR and physical (mixed event). For example, a slot tournament could be composed of players in both the physical casino and the virtual casino 130. Elements of the game/event itself could be composed of data from the physical casino and virtual casino 130, such as the current leaderboard of users across both the physical casino and virtual casino 130 who are participating in the tournament.

In other embodiments, physical aspects of the casino may advertise activities or virtual aspects of the virtual casino 130 that are analogous to those in the physical casino and may interest users who are attracted to similar aspects in the physical casino. For example, a physical sports bar may display on various displays in the sports bar in the physical casino an activity that is going on in one or more virtual sports bars in the virtual casino 130. People in both worlds could be watching and wagering on the same sporting events and then when big plays occur, the celebration (or shock) of the sports bar could be that much more exciting than what is possible in the physical world alone.

Figure 4:
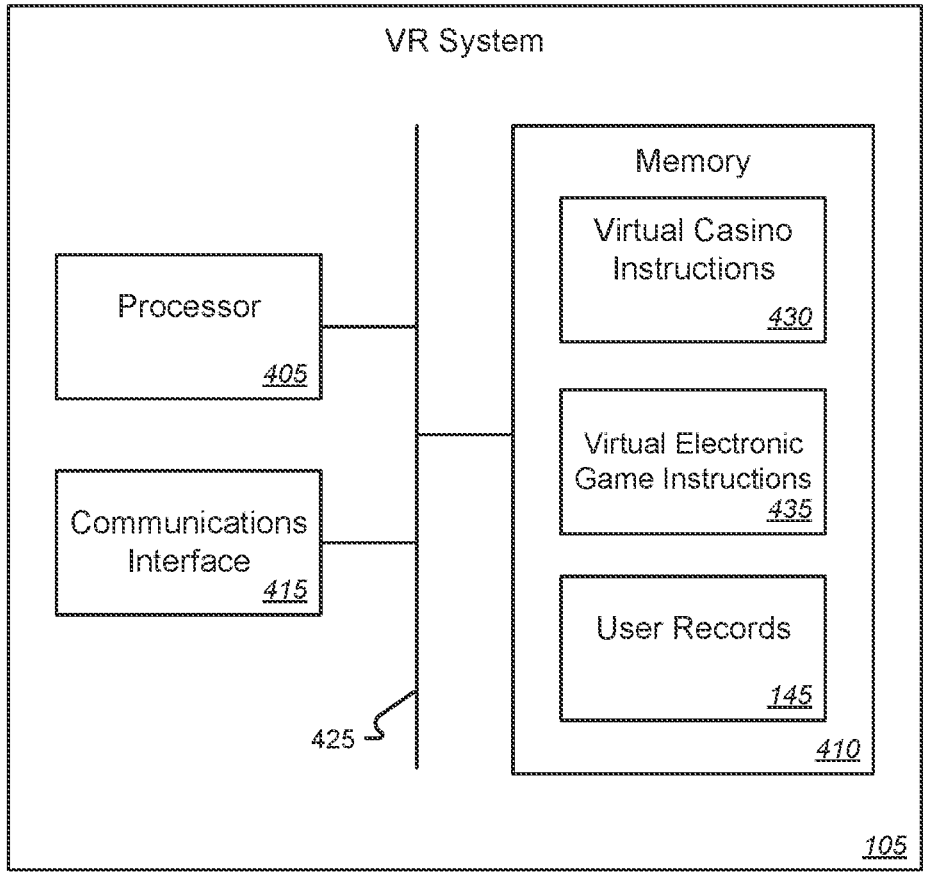
FIG. 4 is a block diagram illustrating additional details of components of an exemplary virtual reality system according to one embodiment of the present disclosure.

FIG. 4 is a block diagram illustrating additional details of components of an exemplary virtual reality system according to one embodiment of the present disclosure. As illustrated in this example, the VR system 105 can comprise a processor 405. The processor 405 may correspond to one or many computer processing devices. For instance, the processor 405 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 405 may be provided as a microprocessor, Central Processing Unit (CPU), or plurality of microprocessors that are configured to execute the instructions sets stored in a memory 410. Upon executing the instruction sets stored in memory 410, the processor 405 enables various functions of the VR system 105 as described herein.

The memory 410 can be coupled with and readable by the processor 405 via a communications bus 425. The memory 410 may include any type of computer memory device or collection of computer memory devices. Non-limiting examples of memory 410 include Random Access Memory (RAM), Read Only Memory (ROM), flash memory, Electronically-Erasable Programmable ROM (EEPROM), Dynamic RAM (DRAM), etc. The memory 410 may be configured to store the instruction sets depicted in addition to temporarily storing data for the processor 405 to execute various types of routines or functions.

The processor 405 can also be coupled with one or more communications interfaces 415. The communication interfaces 415 can comprise, for example, Ethernet, Bluetooth, WiFi, or other type of wired or wireless communications interfaces.

The memory 410 can store therein a set of virtual casino instructions 430 which, when executed by the processor 405, causes the processor 405 to provide, via the communications interface 415, to a plurality of user devices 115A and 115B, a representation of the virtual casino 130. The virtual casino instructions 430 can cause the processor 405 to represent a user 120A and 120B of each of the plurality of user devices 115A and 115B by an avatar 140A and 140B in the virtual casino 130. The virtual casino instructions 430 can cause the processor 405 to execute an electronic game within the virtual casino 130 and provide a representation of the electronic game, e.g., as a virtual EGM of other virtual gaming system 135A, to a first user device 115A of the plurality of user devices 115A and 115B during execution of the electronic game. The first user device 115A can be associated with a player 120A of the electronic game.

The virtual casino instructions 430 can cause the processor 405 to detect a win event within the electronic game during execution of the electronic game. In response to detecting the win event, the virtual casino instructions 430 can cause the processor 405 to provide an indication of the detected win event to a second user device 115B of the plurality of user devices 115A and 115B. The second user device 115B can be associated with a user 120B other than the player 120A of the electronic game. The virtual casino instructions 430 can cause the processor 405 to select the second user device 115B from the plurality of user devices based on a location of the avatar 140B representing the user 120B other than the player 120A of the game within the virtual casino 130 and/or information stored in a set of records 145 maintained in memory 410 including, but not limited to, a predefined constraint related to providing the indication of the detected win event, a status of the user other than the player of the electronic game within the virtual casino, a predefined parameter of a user profile for the user other than the player of the electronic game, and/or other considerations. Providing the indication of the detected win event can comprise modifying the provided representation of the virtual casino 130, changing the avatar for the player 140A of the electronic game in the virtual casino 130, and/or other effects as described above.

In some cases, the virtual casino instructions 430 can cause the processor 405 to receive an indication of a reaction to the win event by the user 120B other than the player 120A of the electronic game from the second user device 115B via the communications interface 415. The virtual casino instructions 430 can cause the processor 405 to provide a representation of the reaction to the win event by the user 120B other than the player 120A of the electronic game to the first user device 115A via the communications interface 415.

Figure 5:
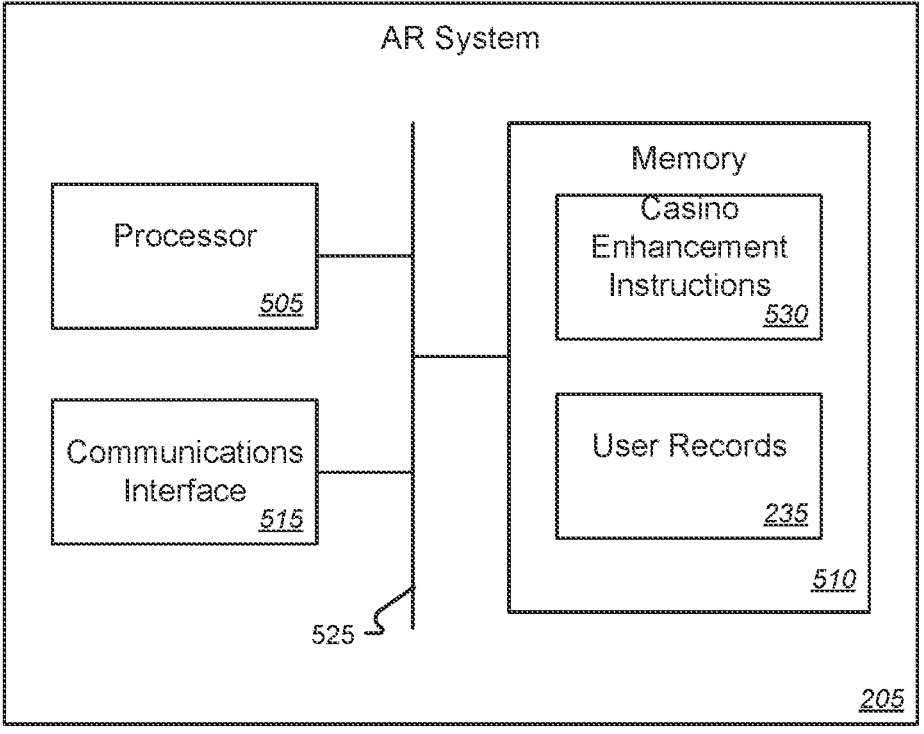
FIG. 5 is a block diagram illustrating additional details of components of an exemplary augmented reality system according to one embodiment of the present disclosure.

FIG. 5 is a block diagram illustrating additional details of components of an exemplary augmented reality system according to one embodiment of the present disclosure. As illustrated in this example, the AR system 205 can comprise a processor 505 such as any of the various types of processors described above. A memory 510 can be coupled with and readable by the processor 505 via a communications bus 525. The memory 510 can comprises any one or more of the different types of volatile and/or non-volatile memories described above. The processor 505 can also be coupled with one or more communication interfaces 515 via the communications bus 525. The communication interfaces 515 can comprise, for example, Ethernet, Bluetooth, WiFi, or other type of wired or wireless communications interfaces.

The memory 510 can store therein a set of casino enhancement instructions 530 which, when executed by the processor 505, causes the processor 505 to receive, from a gaming system 215, via the communications interface 515, an electronic message indicating occurrence of a win event in an electronic game being executed by the gaming system 215. The casino enhancement instructions 530 can further cause the processor 505 to make a determination as to whether to notify a user of an AR device 230 of the occurrence of the win event. The user 225 of the AR device 230 can be other than a player of the electronic game. For example, determining whether to notify the user 225 of the AR device 230 of the occurrence of the win event can be based on a physical location of the user 225 of the AR device 230 within a physical gaming venue in which the gaming system 215 is located.

In response to determining to provide the indication of the win event to the user of the AR device, the casino enhancement instructions 530 can cause the processor 505 to generate an indication of the win event and provide the indication to the AR device 230 via the communications interface 515. The indication of the win event can comprise, for example, a prompt to react to the win event. In some cases, the prompt to react to the win event can comprise a prompt to physically react to the win event. In such cases, the casino enhancement instructions 530 can cause the processor 505 to receive, from the AR device, via the communications interface 515, an indication of an action performed by the user 225 of the AR device 230 and determine, based on the received indication of the action performed by the user 225 of the AR device 230, whether the action performed by the user 225 of the AR device 230 matches an action indicated by the prompt to react to the win event. In response to determining the action performed by the user 225 of the AR device 230 matches the action indicated by the prompt to react to the win event, the casino enhancement instructions 530 can cause the processor 505 to update an electronic user record 235 in the memory 510 and associated with the user 225 of the AR device 230, e.g., to indicate an award or other benefit to the user 225.

Figure 6:
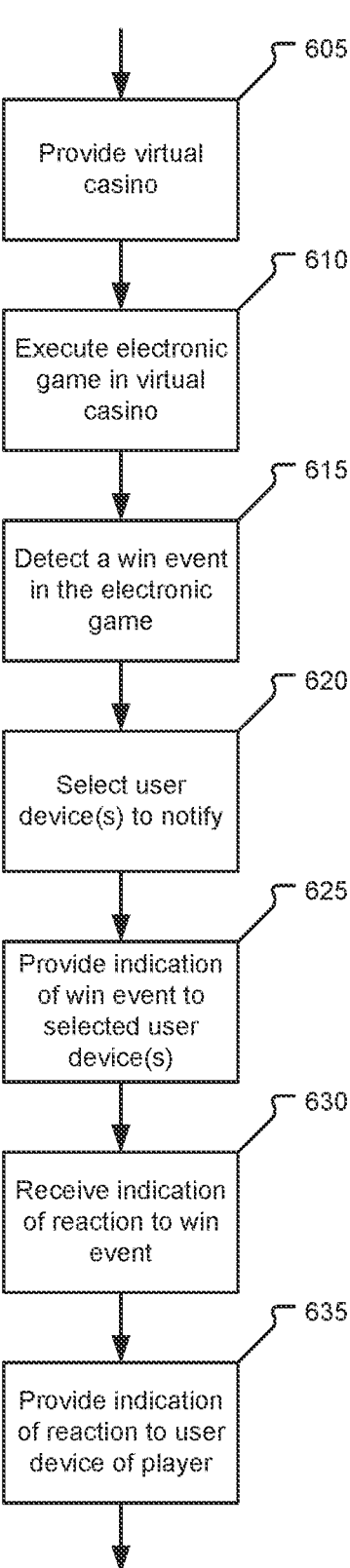
FIG. 6 is a flowchart illustrating an exemplary process for implementing a virtual casino according to one embodiment of the present disclosure.

FIG. 6 is a flowchart illustrating an exemplary process for implementing a virtual casino according to one embodiment of the present disclosure. As illustrated in this example, operating a virtual casino can comprise providing 605, to a plurality of user devices 115, a representation of the virtual casino 130. A user 120A and 120B of each of the plurality of user devices 115A and 115B can be represented in the virtual casino 130 by an avatar 140A-140C. An electronic game can be executed 610 within the virtual casino, e.g., on a virtual gaming system 135, and a representation of the electronic game can be provided to a first user device 115A of the plurality of user devices during execution of the electronic game. The first user device 115A can be associated with a player 120A of the electronic game.

A win event can be detected 615 within the electronic game during execution of the electronic game. In response to detecting 615 the win event, one or more second user devices 115B can be selected 620 and an indication of the detected win event can be provided 625 to the second user device(s) 115B of the plurality of user devices. The second user device(s) can be associated with a user 120B other than the player 120A of the electronic game. The second user device 115B can be selected 620 from the plurality of user devices based on a location of the avatar 140 representing the user 120B other than the player of the game within the virtual casino 130, a predefined constraint related to providing the indication of the detected win event, a status of the user 120B other than the player of the electronic game within the virtual casino 130, a predefined parameter of a user profile for the user 120B other than the player of the electronic game, and/or other considerations. Providing 625 the indication of the detected win event can comprise modifying the provided representation of the virtual casino 310, e.g., panning, displaying text and/or graphics, providing various audio and/or visual effects, etc., changing the avatar 140 for the player of the electronic game in the virtual casino 130, etc.

An indication of a reaction to the win event by the user 120B other than the player of the electronic game can be received 630 from the second user device 115B. In some cases, an indication of an incentive for the user 120B other than the player of the electronic game to react to the win event can be provided to the second user device 115B as part of the indication of the detected win event. A representation of the reaction to the win event by the user 120B other than the player of the electronic game can be provided to the first user device 115A.

Figure 7:
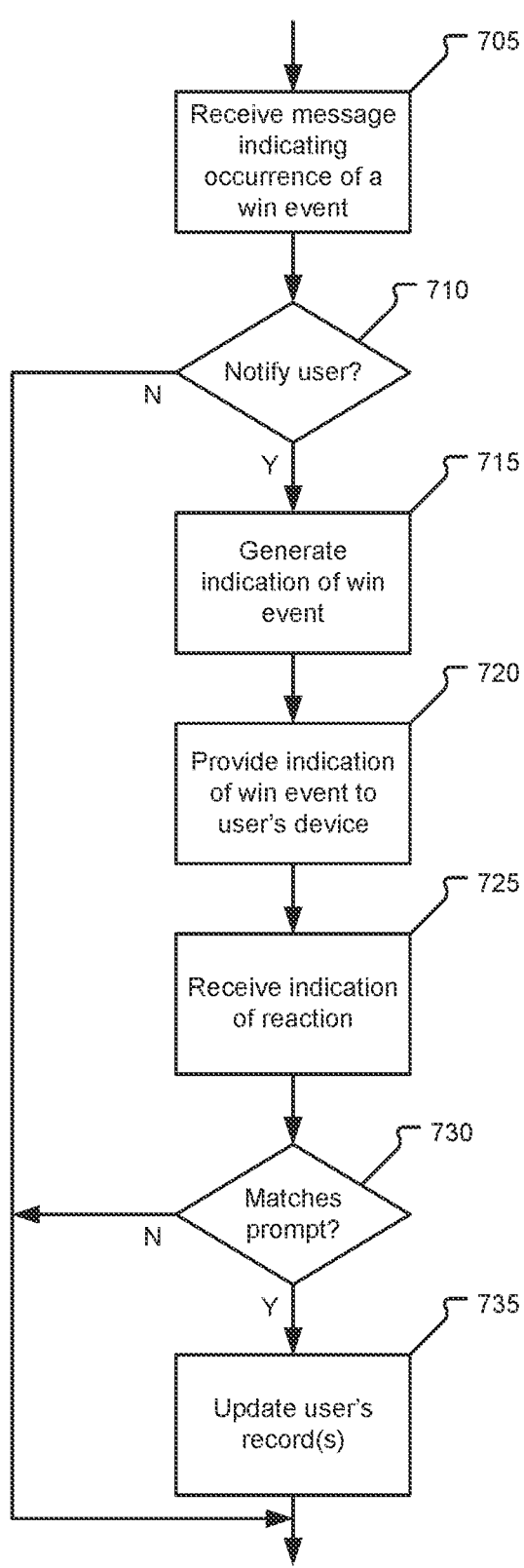
FIG. 7 is a flowchart illustrating an exemplary process for providing augmented reality enhancements according to one embodiment of the present disclosure.

FIG. 7 is a flowchart illustrating an exemplary process for providing augmented reality enhancements according to one embodiment of the present disclosure. As illustrated in this example, for providing augmented reality enhancements in a gaming environment can comprise receiving 705, from a gaming system 215, an electronic message indicating occurrence of a win event in an electronic game being executed by the gaming system 215. A determination 710 can be made as to whether to notify a user 225 of an AR device 230 of the occurrence of the win event. The user 225 of the AR device 230 can be other than a player 220 of the electronic game. For example, determining 710 whether to notify the user 225 of the AR device 230 of the occurrence of the win event can be based on a physical location of the user 225 of the AR device 230 within a physical gaming venue in which the gaming system is located as well as other factors as described above.

In response to determining 710 to provide the indication of the win event to the user 225 of the AR device 230, an indication of the win event can be generated 715 and provided 720 to the AR device 230. The indication of the win event can comprise, for example, a prompt to react to the win event. In some cases, the prompt to react to the win event can comprise a prompt to physically react to the win event. In such cases, an indication of an action performed by the user 225 of the AR device 230 can be received 725 from the AR device 230 and a determination 730 can be made based on the received indication of the action performed by the user 225 of the AR device 230 as to whether the action performed by the user 225 of the AR device 230 matches an action indicated by the prompt to react to the win event. In response to determining 730 the action performed by the user 225 of the AR device 230 matches the action indicated by the prompt to react to the win event, an electronic record 235 associated with the user 225 of the AR device 230 to indicate an award of an offered incentive or other benefit to the user 225 of the AR device 230.

Figure 8:
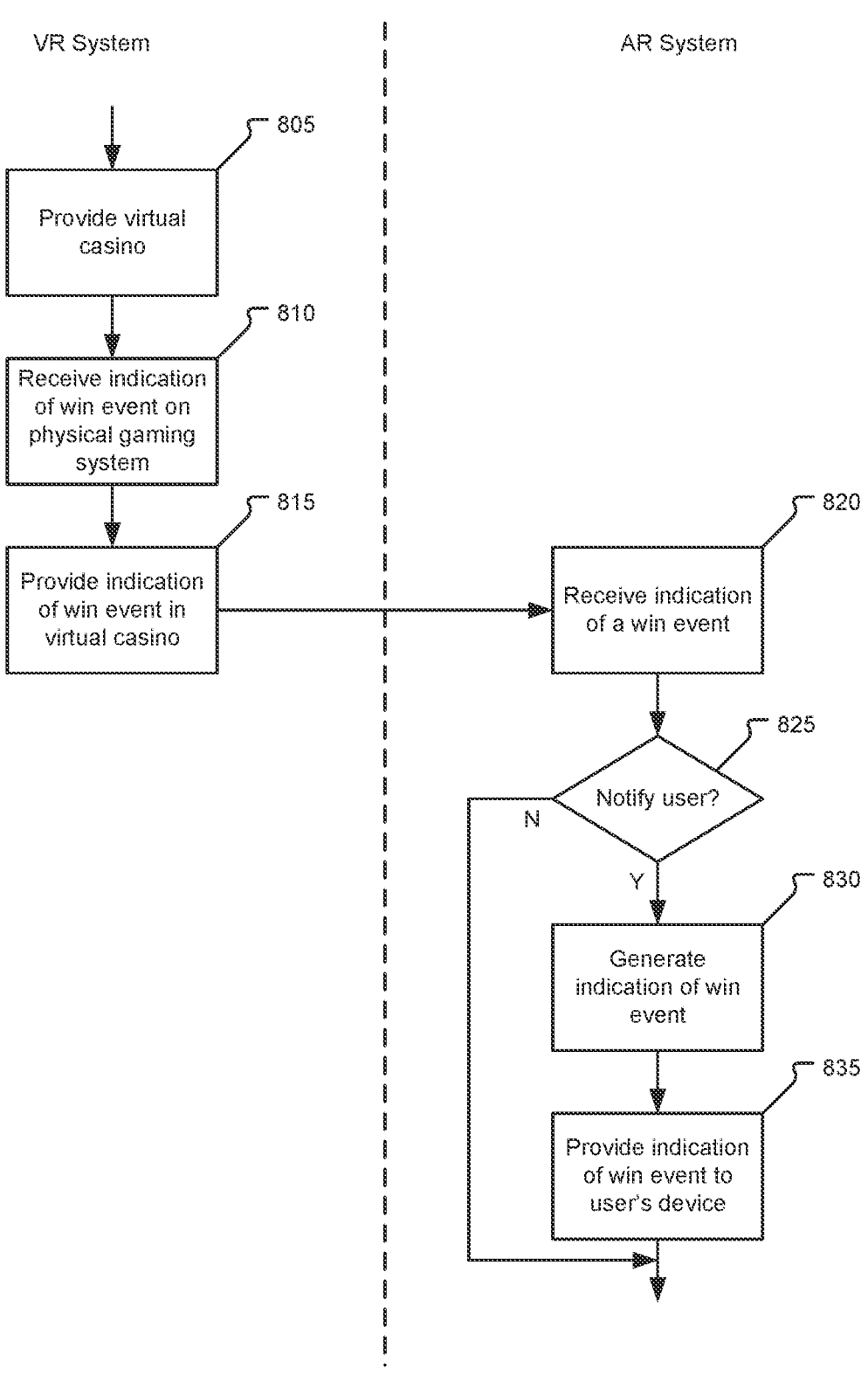
FIG. 8 is a flowchart illustrating an exemplary process for providing a mixed presentation of real life, virtual reality, and augmented reality according to one embodiment of the present disclosure.

FIG. 8 is a flowchart illustrating an exemplary process for providing a mixed presentation of real life, virtual reality, and augmented reality according to one embodiment of the present disclosure. As illustrated in this example, the process can begin with the VR system 105 providing 805, to a VR user device 115A, a representation of a virtual casino 130. The virtual casino can comprise a VR representation 135A of a physical gaming system 215, e.g., an EGM or other gaming system installed in a casino or gaming venue represented in whole or in part in the virtual casino 130. An indication of a win event occurring within the electronic game can be received 810 during execution of the electronic game by the physical gaming system 215 and in response to the indication of the win event, an indication of the detected win event on the VR representation 135A of the physical gaming system 215 in the virtual casino 130 can be provided 815 to the VR user device 115A.

In some cases, an electronic indication of the win event can also be received 820 by the AR system 205, either from the VR system 105 or from the physical gaming system 215. A determination 825 can be made as to whether to notify a user 220 or 225 of an AR device 230 of the occurrence of the win event. The user 225 of the AR device 230 can be a different user 225 from a player 220 of the electronic game or may be the player 220 if the play is using an AR device (not shown in this example). In response to determining 825 to provide the indication of the win event to the user 225 of the AR device 230, an indication of the win event can be generated 830 and provided 835 to the AR device 230.

Figure 9:
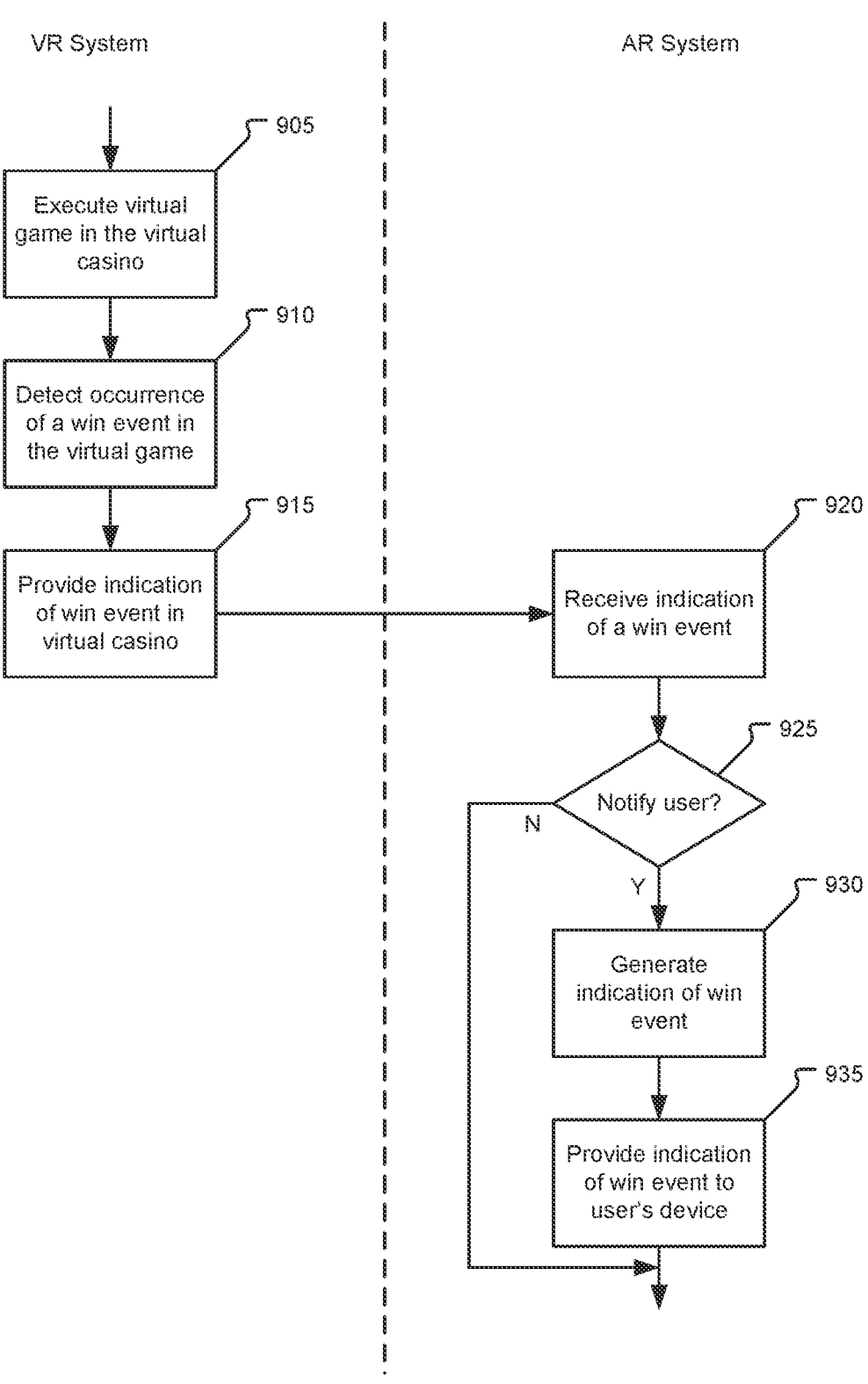
FIG. 9 is a flowchart illustrating an additional or alternative exemplary process for providing a mixed presentation of real life, virtual reality, and augmented reality according to one embodiment of the present disclosure.

FIG. 9 is a flowchart illustrating an additional or alternative exemplary process for providing a mixed presentation of real life, virtual reality, and augmented reality according to one embodiment of the present disclosure. As illustrated in this example, the process can begin with executing a virtual electronic game, e.g., on a virtual gaming system 135B, in the virtual casino 130. In some cases, the virtual electronic game can correspond to the physical gaming system 215. A win event within the virtual electronic game can be detected 910 during execution of the virtual electronic game, and in response to detecting 910 the win event, an indication of the detected win event in the virtual electronic game can be provided 915 to the AR system 205.

The AR system 205 can receive 920 the indication of the win event and make a determination 925 as to whether to notify a user 220 or 225 of an AR device 230 of the occurrence of the win event. In response to determining 925 to provide the indication of the win event to the user 225 of the AR device 230, an indication of the win event can be generated 930 and provided 935 to the AR device 230.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for users to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with users.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for operating a virtual casino, the method comprising:

providing, by a Virtual Reality (VR) system, to a plurality of user devices, a representation of the virtual casino, wherein a user of each of the plurality of user devices is represented in the virtual casino by an avatar;

executing, by the VR system, an electronic game on a virtual gaming system within the virtual casino, wherein a representation of the electronic game is provided to a first user device of the plurality of user devices during execution of the electronic game and wherein the first user device is associated with a player of the electronic game;

detecting, by the VR system, a win event within the electronic game during execution of the electronic game;

in response to detecting the win event, providing, by the VR system, to a second user device of the plurality of user devices, an indication of the win event, wherein the second user device is associated with a user other than the player of the electronic game, wherein providing the indication of the win event comprises modifying the provided representation of the virtual casino;

providing, by the VR system, to the second user device, an indication of an incentive for the user other than the player of the electronic game to react to the win event; receiving, by the VR system, from the second user device, an indication of a reaction to the win event by the user other than the player of the electronic game; and providing, by the VR system, to the first user device, a representation of the reaction to the win event by the user other than the player of the electronic game.

2. The method of claim 1, wherein the second user device is selected from the plurality of user devices based on a location of the avatar representing the user other than the player of the game within the virtual casino.

3. The method of claim 1, wherein the second user device is selected from the plurality of user devices based on a predefined constraint related to providing the indication of the win event.

4. The method of claim 1, wherein the second user device is selected from the plurality of user devices based on a status of the user other than the player of the electronic game within the virtual casino.

5. The method of claim 1, wherein the second user device is selected from the plurality of user devices based on a predefined parameter of a user profile for the user other than the player of the electronic game.

6. The method of claim 1, wherein modifying the provided representation of the virtual casino comprises modifying the appearance of the virtual gaming system.

7. The method of claim 1, wherein modifying the provided representation of the virtual casino further comprises changing the avatar for the player of the electronic game in the virtual casino.

8. A system comprising:
a communications network;
an Augmented Reality (AR) device communicatively coupled with the communications network, wherein the AR device is worn by a user of the AR device in a physical gaming venue; and
an AR server communicatively coupled with the communications network and comprising:
a processor; and
a memory coupled with and readable by the processor and storing therein a set of instructions which, when executed by the processor, causes the processor to:
receive, from a gaming system in the physical gaming venue, an electronic message indicating occurrence of a win event in an electronic game being executed by the gaming system,
determine whether to notify the user of the AR device of the occurrence of the win event, wherein the user of the AR device is not a player of the electronic game, and
in response to determining to notify the user of the AR device of the occurrence of the win event, generate an indication of the win event and provide the indication of the win event to the AR device via the communications network, wherein the indication of the win event comprises a prompt to physically react to the win event;
receive, from the AR device, via the communications network, an indication of an action performed by the user of the AR device, and
determine, based on the indication of the action performed by the user of the AR device, whether the action performed by the user of the AR device matches an action indicated by a prompt to physically react to the win event.

9. The system of claim 8, wherein determining whether to notify the user of the AR device of the occurrence of the win event is based on a physical location of the user of the AR device within the physical gaming venue relative to the gaming system.

10. The system of claim 8, wherein the instructions further cause the processor to, in response to determining the action performed by the user of the AR device matches the action indicated by the prompt to react to the win event, update an electronic record associated with the user of the AR device to indicate an award to the user of the AR device.

11. A system comprising:
a communications network;
a physical gaming system communicatively coupled with the communications network and executing an electronic game;
a first user device communicatively coupled with the communications system;
a second user device communicatively coupled with the communication system; and
a Virtual Reality (VR) system communicatively coupled with the communications network and comprising:
a processor; and
a memory coupled with and readable by the processor and storing therein a set of instructions which, when executed by the processor, causes the processor to:
provide, to the user device, via the communications network, a representation of a virtual casino, wherein the virtual casino comprises a VR representation of the physical gaming system,
receive, from the physical gaming system, via the communications network, an indication of a win event occurring within the electronic game during execution of the electronic game by the physical gaming system,
in response to the indication of the win event, provide, to the first user device, through the communications network, an indication of the win event on the VR representation of the physical gaming system in the virtual casino, wherein providing the indication of the win event comprises modifying the provided representation of the virtual casino,
provide an indication of an incentive to react to the win event provided to the second user device,
receive, from the second user device an indication of a reaction to the win event by the second user device, and
provide, via the communications network, to the first user device, a representation of the reaction to the win event from the second user device.

12. The system of claim 11, further comprising an Augmented Reality (AR) system, the AR system comprising:
a processor; and
a memory coupled with and readable by the processor and storing therein a set of instructions which, when executed by the processor, causes the processor to:
receive, from the physical gaming system, via the communications network, an electronic indication of the win event,
determine whether to notify a user of an AR device of the occurrence of the win event, wherein the user of the AR device is not a player of the electronic game, and in response to determining to provide the indication of the win event to the user of the AR device, generate an indication of the win event and provide the generated indication of the win event to the AR device via the communications network.

13. The system of claim 12, wherein the instructions executed by the processor of the VR system further cause the processor of the VR system to:

execute a virtual electronic game in the virtual casino, the virtual electronic game corresponding to the physical gaming system;

detect a VR win event within the virtual electronic game during execution of the virtual electronic game;

in response to detecting the VR win event, provide, to the AR system, via the communications network, an indication of the VR win event in the virtual electronic game.

14. The system of claim 13, wherein the instructions executed by the processor of the AR system further cause the processor of the AR system to:

receive, from the VR system, via the communications network, the indication of the VR win event in the virtual electronic game; and determine whether to provide the user of the AR device a notification of the VR win event in the virtual electronic game.

15. The system of claim 14, wherein the instructions executed by the processor of the AR system further cause the processor of the AR system to, in response to determining to provide the user of the AR device notification of the VR win event in the virtual electronic game, generate an indication of the VR win event and provide the generated indication of the VR win event to the AR device via the communications network.

* * * * *